Patented May 4, 1943

2,318,266

UNITED STATES PATENT OFFICE 2,318,266

DYESTUFFS OF THE DIBENZANTHRONE SERIES

Otto Stallmann, Bridgeton, N. J., assignor to E. I. du Pont de Nemours & Company, Wilmington, Del., a corporation of Delaware No Drawing. Application January 20, 1939, Serial No. 251,961

8 Claims. (Cl. 260—338)

This invention relates to the preparation of new and valuable dyestuffs of the dibenzanthrone series. The invention relates more particularly to the preparation of new ether derivatives of Bz-2:Bz-2'-dihydroxydibenzanthrone which may be produced by the alkylation of Bz-2:Bz-2'-dihydroxydibenzanthrone with polymethylene halides or equivalent alkylating agents, such as the polymethylene di(aryl-sulfonic acid esters), which carry the reactive halogen (or similarly reacting ester grouping) on non-adjacent carbon atoms.

The alkylation of dihydroxydibenzanthrone with various types of alkylating agents is disclosed in U. S. Patent 1,531,261 and the dyestuffs disclosed in that patent dye in shades varying from green through blue to violet. The alkylation of dihydroxydibenzanthrone with dimethyl sulfate gives a green dyestuff. However, it has been found that in general the substitution of higher alkylating agents which carry only one reactive halogen or sulfate group for dimethyl sulfate give dyestuffs which dye in very bluish shades of green. The higher dialkoxy derivatives of this type, however, such as the diethoxy, dipropoxy and dibutoxy compounds exhibit poor dyeing properties for they do not exhaust well and change on soaping. Alkylating agents of the type of ethylene dibromide in which the reactive halogens are connected to adjacent carbon atoms in the alkyl chain give dyestuffs which dye in blue shades. German Patent 451,122 describes the alkylation of dihydroxydibenzanthrone with esters of polybasic alcohols, such as the p-toluene sulfonic acid ester of ethylene glycol, ethylene chlorhydrin and 1:3-dichloro-2-propanol. These products dye in blue shades. It is known, however, that the organic ester group in this type of alkylating agent reacts more readily than the chloride group, and it has been definitely concluded that the alkylation of the dihydroxydibenzanthrone in each case is effected on adjacent carbon atoms in the alkyl chain, and these dyes are analogous to the ethylene dibromide ether.

I have found that new and valuable dyestuffs which dye in green shades may be produced by reacting Bz-2:Bz-2'-dihydroxydibenzanthrone with polymethylene halides or the polymethylene di(aryl-sulfonic acid esters) in which the reactive halogen or ester groupings are on non-adjacent carbon atoms, and that these new dyestuffs all dye in very bright and strong shades exhausting well on the fiber from their alkaline hydrosulfite vats and exhibit good fastness properties.

I have also found that these new dyestuffs are excellent printing colors and are all prepared in substantially quantitative yields where the straight chain compounds of the type above mentioned are employed.

It is, therefore, an object of this invention to prepare new and desirable green dyestuffs of the alkoxydibenzanthrone series which dye in bright bluish green to yellowish green shades and exhibit excellent dyeing and fastness properties.

In the preparation of these new colors, the Bz-2:Bz-2'-dihydroxydibenzanthrone, preferably employed in the form of its alkali metal salt, is reacted in the presence of alkaline condensing agents with aliphatic dihalogen compounds which carry the halogens on two different non-adjacent carbon atoms. The sodium or potassium salts in the form of powders or flakes of the Bz-2:Bz-2'-dihydroxydibenzanthrone may be prepared according to U. S. Patent 1,950,366 by mixing 2 parts (dry equivalent) of the technical or purified dihydroxydibenzanthrone filter press cake with 1 part (dry basis) of soda ash, potassium carbonate, or sodium or potassium acetate solutions, and then drying the resulting paste preferably on a drum dryer or in vacuo at 100° C.

The reaction may be carried out by suspending the Bz-2:Bz-2'-dihydroxydibenzanthrone or the above mentioned alkali metal salt preparations in an inert organic solvent or in an excess of the alkylating agent and heating to reaction temperatures of 100–220° C. in the presence of alkaline condensing agents. The alkaline condensing agents which may be employed may be any of those mentioned in U. S. Patents 1,761,624 and 1,531,261. Working with the dihalogen alkanes, which boil at 120° C. or higher, it is possible to employ an excess of the alkylating agent as the solvent in place of employing an inert organic solvent since the separation of the second solvent from the reaction mass is thereby made unnecessary. Reaction may, of course, be carried out in any of the high boiling inert organic solvents, such as the chlorobenzenes, solvent naphtha, nitrobenzene, etc. The aryl-sulfonic acid esters of the corresponding polymethylene dihydroxy compounds may be used in place of the dihalogen compounds in these same solvents.

Although the structural formula of these new dyestuffs has not been definitely ascertained, it is known that the reaction takes place between equal molecular quantities of the alkylating agent and the dihydroxydibenzanthhrone. The resulting compounds are free from halogen and appear to contain no free hydroxyl groups in the ether chain. They are, therefore, considered to be alkyl ethers of Bz-2:Bz-2'-dihydroxydibenzanthrone in which the alkyl radical on each hydroxyoxygen is of the formula:

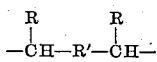

which alkyl radical contains not more than 10 carbon atoms and in which the R's stand for an H or —CH₃, and R' for an alkyl radical, and in which both carbon atoms are attached to hydroxy-oxygen of dihydroxydibenzanthrone. These new compounds, therefore, may be of either of the following general formulae:

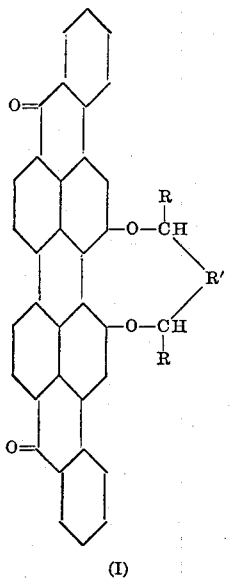

or

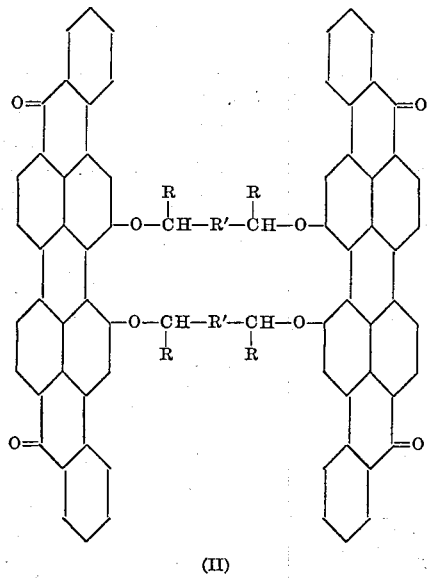

Only a small excess of alkylating agent need be employed in this reaction unless it is used as the solvent in which the reaction is carried out. These compounds may be converted to the leuco sulfuric acid esters by the usual procedure employed in preparing leuco sulfuric acid esters of alkoxydibenzanthrones. These new dyestuffs may also be converted to the stable reduction derivatives by the process more particularly disclosed in co-pending application Serial No. 186,750. In this new series of dyestuffs, it has been found that, as the length of the alkyl chain between the reactive halogen or ester groups in the alkylating agent employed increases, the dyestuffs become greener, while in the alkylation of dihydroxydibenzanthrone with alkylating agents containing only one reactive halogen, sulfonic acid ester group, etc., the dyestuffs become bluer as the length of the side chain is increased.

The following examples are given to illustrate the invention more fully. The parts used are by weight.

*Example 1*

25 parts of the soda ash salt of Bz-2:Bz-2'-dihydroxydibenzanthrone (prepared according to U. S. Patent 1,950,366 by slurrying 2 parts (dry basis) of Bz-2:Bz-2'-dihydroxydibenzanthrone filter press cake with 1 part (dry basis) of sodium carbonate solution, then drying and pulverizing the dry product) and 20 parts of anhydrous potassium carbonate are suspended in 250 parts of dry ortho-dichlorobenzene. The suspension is heated to 175° C. and 10 parts of 1:3-dibromopropane are added. The reaction mass is continuously distilled, and the small amount of water liberated by the reaction is mechanically separated from the distillate while the solvent layer is returned to the reaction mass. The reaction is continued with agitation at the reflux temperature for 16 hours, and then cooled and filtered at room temperature. The cake is steam distilled free from ortho-dichlorobenzene; and the product is filtered off, washed alkali-free and dried. The crude dye may be purified by crystallizing one part of the crude color from 100 parts of hot trichlorobenzene. From this hot solvent solution the dye is obtained on cooling in the form of plates, which give red solutions when dissolved in concentrated sulfuric acid. The dye forms a blue vat (having a reddish fluorescence) with alkaline hydrosulfite solutions, and dyes cotton therefrom in bright bluish green shades of excellent fastness properties. This vat dye, when converted into a printing paste by known methods, gives bright and strong bluish green prints of excellent fastness properties.

The crude dye may also be purified by treatment of the crude color with long chain aliphatic acid chlorides, according to the method described in co-pending application Serial No. 209,995 which may be carried out for instance as follows:

10 parts of the dry, crude color are added to a mixture of 60 parts of dry nitrobenzene and 4 parts of dry pyridine. The mass is heated with agitation to 80–85° C. and 4 parts of crude lauric acid chloride are added slowly during 1 hour. The esterification mass is heated to 125–130° C., held at this temperature for 2 hours, and then cooled to room temperature and filtered. The cake is washed with 10 parts of nitrobenzene, and then steam distilled in the presence of some soda ash until free from nitrobenzene. The purified dye thus obtained is filtered off, washed alkali-free, and dried. In this manner all "hydroxylated" impurities and any unreacted dihydroxydibenzanthrone present in the crude color are removed in the form of their solvent soluble laurates.

Other condensing agents, such as sodium acetate, sodium carbonate and potassium acetate may be used in the alkylation reaction together with or in place of potassium carbonate. Likewise other inert high boiling organic solvents, such as trichlorobenzene, naphthalene and nitrobenzene may be employed in place of ortho-dichlorobenzene, used in this example.

1:3-dichloropropane when substituted for 1:3-dibromopropane gives the identical dyestuff, although because of its lower boiling point a larger excess should be employed.

*Example 2*

25 parts of the soda ash salt of Bz-2:Bz-2'-dihydroxydibenzanthrone, 20 parts of anhydrous potassium carbonate, and 12 parts of 1:3-dibromobutane are reacted in 250 parts of dry ortho-dichlorobenzene, using the method described in Example 1. At the end of 16 hours the reaction mass is cooled to ordinary temperature and filtered. The cake is washed with alcohol, then alkali-free with water and dried. The crude product may be purified by crystallizing one part of the crude dyestuff from 40 parts of hot trichlorobenzene or by esterification of the impurities with lauric acid chloride. The purified color, thus obtained in the form of small plates, is soluble in concentrated sulfuric acid with a violet color. The dye is soluble in alkaline hydrosulfite solutions forming a blue vat which shows a reddish fluorescence, from which cotton is dyed in strong and bright blue green shades, possessing excellent fastness properties. The color is also very suitable for printing.

*Example 3*

25 parts of the soda ash salt of Bz-2:Bz-2'-dihydroxydibenzanthrone, 20 parts of anhydrous sodium acetate, and 50 parts of 1:3-dichloro-isobutane are reacted in 250 parts of dry ortho-dichlorobenzene according to the method described in Example 1. At the end of 15 hours reflux the reaction mass is cooled and filtered at room temperature. The filtrate and cake are worked up separately, since it was found that two different dyes are formed by the reaction, one of which is much more soluble in organic solvents than the other. The filtrate is steam distilled free from ortho-dichlorobenzene, and the dyestuff thus obtained is filtered off and dried. After crystallizing 1 part of the material from 15 parts of ortho-dichlorobenzene, the pure dyestuff is obtained in the form of plates, which dissolve in concentrated sulfuric acid with a brownish violet color. This purified dyestuff forms a blue vat having a reddish fluorescence with alkaline hydrosulfite solution, from which cotton is dyed in fast bluish green shades, similar in general fastness properties and in shade to the products of the previous examples.

The solvent insoluble portion of the alkylation product, obtained as the filter cake, may be steam distilled to free it from the solvent, and the crude product thus obtained is filtered off, washed alkali-free and dried. 1 part of this dry product may be crystallized from 30 parts of hot ortho-dichlorobenzene, from which it is deposited on cooling in the form of plates. This alkyl derivative imparts a reddish violet color to concentrated sulfuric acid. This purified dye forms a blue alkaline hydrosulfite vat, with a reddish fluorescence, and dyes cotton in fast, reddish blue shades. This latter dyestuff appears therefore to be entirely different in structure from that of the other (bluish green dyeing) 1:3-alkane ethers and it is believed to be formed from a portion of the 1:3-dichloro-isobutane, which has been rearranged prior to the condensation with dihydroxydibenzanthrone.

*Example 4*

25 parts of the potassium carbonate salt of Bz-2:Bz-2'-dihydroxydibenzanthrone, 20 parts of anhydrous sodium carbonate, and 12 parts of 1:4-dibromobutane are reacted in 250 parts of dry ortho-dichlorobenzene, using the method described in Example 1. The dyestuff formation is completed at the end of 17 hours heating and the whole reaction mass is steam distilled free from ortho-dichlorobenzene. The dyestuff is filtered off, washed alkali-free, and dried, and 1 part of the crude color is crystallized from 60 parts of hot nitrobenzene. The purified dye is deposited from the cooled solvent in the form of octagonal plates, which give reddish violet solutions, when dissolved in concentrated sulfuric acid. The dye forms a blue alkaline hydrosulfite vat (having a reddish fluorescence), from which cotton is dyed in very fast green shades, which are yellower in tone than those obtained from the above described 1:3-alkane ethers. This color may be used in the conventional printing pastes to give desirable bright green shades.

*Example 5*

15 parts of the soda ash salt of Bz-2:Bz-2'-dihydroxydibenzanthrone, 7.5 parts of anhydrous potassium carbonate, 4 parts of anhydrous sodium acetate, and 12.5 parts of 1:5-dibromopentane are reacted in 100 parts of dry ortho-dichlorobenzene, using the procedure described in Example 1. The dyestuff formation is completed at the end of 17 hours heating and the reaction mass is cooled and filtered at the room temperature. The cake is steam distilled free from the solvent; and the crude dyestuff is filtered off, washed alkali-free and dried. 1 part of the product is crystallized from 50 parts of hot trichlorobenzene. The purified color is thus obtained in the form of small plates, which give a blue alkaline hydrosulfite vat (having a reddish fluorescence). It dyes and prints cotton in fast green shades somewhat yellower than the product of Example 4. The dye forms reddish violet solutions, when dissolved in strong sulfuric acid.

*Example 6*

25 parts of the soda ash salt of Bz-2:Bz-2'-dihydroxydibenzanthrone, 12.5 parts of anhydrous potassium carbonate, and 15 parts of the di-(p-toluene sulfonic acid ester) of trimethylene glycol (1:3-propanediol) are reacted in 250 parts of dry ortho-dichlorobenzene, using the procedure described in Example 1. At the end of 16 hours heating the reaction is completed, and the mass is filtered at room temperature. The cake is steam distilled free from solvent, and the product is filtered off, washed alkali-free, and dried. The crude dye is purified by the methods described in Example 1. The purified dye is identical with the product obtained in Example 1.

*Example 7*

25 parts of the soda ash salt of Bz-2:Bz-2'-dihydroxydibenzanthrone, 20 parts of anhydrous potassium carbonate, and 15 parts of the di-(p-toluene sulfonic acid ester) of hexamethylene glycol (1:6-hexanediol) are reacted in 250 parts of dry ortho-dichlorobenzene, using the method described in Example 1. At the end of 17 hours heating the reaction is completed, and the reaction mass is steam distilled free from solvent. The crude product is filtered off, washed, and dried. 1 part of this material is extracted with 30 parts of hot trichlorobenzene. An equal volume of methyl alcohol is added to the extract, and the mixture is filtered at room temperature. The cake is washed free from trichlorobenzene with alcohol, and is then dried. The purified dyestuff, thus obtained, forms a blue alkaline hydrosulfite vat from which cotton is dyed in fast green shades. The color dissolves in concentrated sulfuric acid with a brownish violet solution.

The dihalogen or di-(aryl-sulfonic acid esters) of other alkanes in which the reactive groups on non-adjacent carbon atoms may be on the end or intermediate carbon atoms in the aliphatic chain, such as 2:4-dibromopentane, 1:10-dibromodecane, etc., may be substituted in the above examples to give dyestuffs of similar constitution which dye in green to bluish green shades.

I claim:

1. Alkyl ethers of Bz-2:Bz-2'-dihydroxydibenzanthrone which dye cotton from blue alkaline hydrosulfite vats in bluish-green to yellowish green shades, in which the alkyl radical on each hydroxy-oxygen is of the formula:

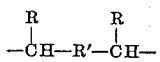

which alkyl radical contains not more than 10 carbon atoms, and in which both R's stand for a substituent of the class consisting of H and —CH₃, and R' for an alkyl radical, and in which both carbon atoms are attached to hydroxy-oxygen of dihydroxydibenzanthrone, said ethers being identical with those prepared by alkylating Bz2-Bz2'-dihydroxy-dibenzanthrone with polymethylene halides in which the reactive halogen atoms are on non-adjacent carbon atoms.

2. The alkyl ether of Bz-2,Bz-2'-dihydroxy-dibenzanthrone in which the alkyl radical on each hydroxy oxygen is of the formula

which dyes cotton from a blue alkaline hydrosulfite vat in bluish-green shades, said alkyl ether being identical with that prepared by alyklating Bz2-Bz2'-dihydroxy-dibenzanthrone with 1,3-dibromopropane.

3. The alkyl ether of Bz-2,Bz-2'-dihydroxy-dibenzanthrone in which the alkyl radical on each hydroxy oxygen is of the formula

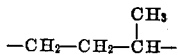

which dyes cotton from a blue alkaline hydrosulfite vat in blue-green shades, said alkyl ether derivative being identical with that prepared by alkylating Bz2-Bz2'-dihydroxy - dibenzanthrone with 1,3-dibromobutane.

4. The alkyl ether of Bz-2,Bz-2'-dihydroxy-dibenzanthrone in which the alkyl radical on each hydroxy oxygen is of the formula

—CH₂—CH₂—CH₂—CH₂— which dyes cotton from a blue alkaline hydrosulfite vat in green shades, said alkyl ether being identical with that prepared by alkylating Bz2-Bz2'-dihydroxy-dibenzanthrone with 1,4-dibromobutane.

5. The process for preparing alkyl ethers of Bz-2,Bz-2'-dihydroxy-dibenzanthrone which comprises reacting a compound of the class consisting of Bz-2,Bz-2'-dihydroxy-dibenzanthrone and its alkali metal salts in the presence of an alkaline condensing agent with a compound of the class consisting of dihalogen alkyl compounds and di(arylsulfonic acid esters) of dihydroxy alkyl compounds which carry the halogen and the arylsulfonic acid radicals on two different non-adjacent carbon atoms, which alkyl compounds contain not more than 10 carbon atoms.

6. The process for preparing alkyl ethers of Bz-2,Bz-2'-dihydroxy-dibenzanthrone which comprises reacting Bz-2,Bz-2'-dihydroxy-dibenzanthrone alkali metal salt in the presence of an alkaline condensing agent with 1,3-dihalogen propane until the hydroxy groups are completely alkylated.

7. The process for preparing alkyl ethers of Bz-2,Bz-2'-dihydroxy-dibenzanthrone which comprises reacting Bz-2,Bz-2'-dihydroxy-dibenzanthrone alkali metal salt in the presence of an alkaline condensing agent with 1,3-dihalogen butane until the hydroxy groups are completely alkylated.

8. The process for preparing alkyl ethers of Bz-2,Bz-2'-dihydroxy-dibenzanthrone which comprises reacting Bz-2,Bz-2'-dihydroxy-dibenzanthrone alkali metal salt in the presence of an alkaline condensing agent with 1,4-dihalogen butane until the hydroxy groups are completely alkylated.

OTTO STALLMANN.